United States Patent [19]

Hampel

[11] Patent Number: 5,419,862
[45] Date of Patent: May 30, 1995

[54] PROCESS FOR THE LOW-POLLUTION OPERATION OF AN EXPLOSION DEVICE AND SUITABLE EXPLOSION DEVICE FOR IMPLEMENTING THIS PROCESS

[76] Inventor: Heinrich Hampel, Kalvarienstr. 18, B-4850 Moresnet-Ch., Belgium

[21] Appl. No.: 142,455

[22] PCT Filed: May 27, 1992

[86] PCT No.: PCT/DE92/00431
§ 371 Date: May 6, 1994
§ 102(e) Date: May 6, 1994

[87] PCT Pub. No.: WO92/21918
PCT Pub. Date: Dec. 10, 1992

[30] Foreign Application Priority Data

May 29, 1991 [DE] Germany ............ 41 17 504.2

[51] Int. Cl.⁶ ............................................. B29C 33/10
[52] U.S. Cl. ............................ 264/84; 29/421.2; 72/56; 264/101; 425/1; 588/202
[58] Field of Search ............ 264/84, 101; 425/1, 425/DIG. 15; 588/202; 29/421.2; 72/56

[56] References Cited

U.S. PATENT DOCUMENTS 3,464,249  9/1969  Klein ........................... 72/56
3,611,766  10/1971  Klein et al. .................. 72/56

FOREIGN PATENT DOCUMENTS 2645347  4/1978  Germany .
1128248  9/1968  United Kingdom .
1248098  9/1971  United Kingdom .
2121935  1/1984  United Kingdom .

OTHER PUBLICATIONS

Navy Technical Disclosure Bulletin, vol. 2, No. 6 (Jun. 1977).

Primary Examiner—Leo B. Tentoni
Attorney, Agent, or Firm—David C. Purdue; John C. Purdue

[57] ABSTRACT

An explosion device for use in connection with the explosive disposal of poisons, explosives and the like and a method for operating the device are disclosed. The device comprises an explosion chamber which is anchored in a foundation, a lock chamber including an inner door for transferring an explosive mixture from the lock chamber into the explosion chamber and an outer door for removing material from the lock chamber, a compensating device in the explosion chamber to absorb the explosive energy generated by the explosion of an explosive mixture in the explosion chamber, a vacuum system, and means connecting the vacuum system to the lock chamber and to the explosion chamber for establishing a vacuum condition within the lock chamber and within the explosion chamber. The inner door of the lock chamber is operable, in a closed position, to prevent communication between the explosion chamber and the lock chamber. The disclosed method comprises placing an explosive mixture into the lock chamber, evacuating the lock chamber with a vacuum to produce a subatmospheric pressure condition in the lock chamber, transferring the explosive mixture from the lock chamber to the explosion chamber, evacuating the explosion chamber with a vacuum to produce a subatmospheric pressure condition in the explosion chamber, initiating explosive combustion of the explosive mixture in the explosion chamber, evacuating the gaseous reaction products of the explosive combustion from the explosion chamber and removing solid reaction products from the explosive combustion from the explosion chamber through the lock chamber.

20 Claims, 4 Drawing Sheets

PROCESS FOR THE LOW-POLLUTION OPERATION OF AN EXPLOSION DEVICE AND SUITABLE EXPLOSION DEVICE FOR IMPLEMENTING THIS PROCESS

FIELD OF THE INVENTION

This invention relates to methods for operating an explosion device for explosively forming workpieces and for the explosive disposal of explosives, poisons and the like. More specifically, the invention relates to method for operating such a device with low pollution and to an explosion device, including at least one explosion chamber, for practicing the method.

BACKGROUND OF THE INVENTION

It is known from the prior art (DE-OS 2 645 347) that explosives can be prepared outside the explosion chamber prior to introduction into the chamber and that such prepared explosives can then be introduced into the explosion chamber by opening said chamber and to carry out the explosion in a negative pressure environment and, after detonation, to remove the reaction products or any processed workpieces by again completely opening the explosion chamber.

The detailed procedure of introducing the explosives into the explosion chamber and removing the reaction products is saddled with the disadvantage that, during the initial preparation of the explosives for the explosion process, harmful noxious components can be released to the environment. In addition, toxic components generated during the combustion process can be released to the environment during opening of the explosion chamber. Furthermore, prior to opening the explosion chamber, extended time periods have to be allowed for to clean the interior of the explosion chamber.

SUMMARY OF THE INVENTION

Unlike the prior art explosive combustion processes, in which pollutants enter the environment both during the preparation of the explosive for explosive treatment and on opening of the explosion chamber, with the process of the invention, such pollutants are kept away from the environment. In addition, filling of the explosion chamber with explosive is rationalized in time. In this explosion device the explosion chamber (1) co-operates with a lock chamber (7) and a preparation chamber (20). In the process the raw materials for the explosive are, for example, first introduced into the preparation chamber (20) where the final explosive mixture is made and then taken through the lock chamber (7) into the explosive chamber (1) which is constantly kept at a negative pressure. Any end products and carrier materials in solid form are then removed from the explosion chamber (1) via a similar lock system. The process is suitable for the explosive disposal of explosives and poisons and for the explosive production of workpieces.

The subject of the invention consists of a process for the low-pollution operation of an explosion device which features at least one explosion chamber, said device being specifically suitable for the explosive disposal of explosives and poisons and for the explosive forming of workpieces, where explosives are introduced into the explosion chamber by means of a lock chamber, and where a negative pressure is produced in the explosion chamber, and where the explosives are subsequently transformed into predominantly gaseous combustion products by explosive combustion, and where these combustion products are finally removed from the explosive chamber.

The invention furthermore concerns an explosion device to implement this process, where at least one explosion chamber is anchored in a foundation, and where said explosion chamber is equipped with entry and removal facilities, with compensating devices to absorb the explosive energy in the explosion chamber wall, and where said explosion chamber is connected to a vacuum system.

In contrast, it is the objective of the present invention to elaborate a procedure and an explosion device of the type described above, where, first of all, the toxic materials arising during preparation of the explosives and those generated by the explosion, are being kept away from the environment, and where, additionally, the charging of the explosion chamber with explosives can be carried out in a more rational manner with respect to time.

According to the instant invention, these objectives are achieved for the above described procedure by introducing the explosives into a lock chamber, by producing a negative pressure in the lock chamber, by moving the explosives from the lock chamber into the explosion chamber, which at all times is hermetically sealed and isolated from the environment, by removing the gaseous reaction products by suction from the explosion chamber until the desired negative pressure is achieved, and by removing any solid combustion products or carrier materials resulting from the explosive combustion from the explosion chamber through the lock chamber. According to the procedure of this invention, the explosion chamber remains continuously under negative pressure during operation, which, for a start, avoids prolonged pumping times and a considerable energy investment, to re-acquire the desired negative pressure level. In this context it is worth pointing out that typical volumes of explosion chambers are in the order of magnitude of several hundred cubic meters. The evacuated gaseous reaction products from the explosion chamber can then be properly disposed of in a next step, for example with the use of state of the art filtration systems. Ultimately, this procedure guarantees that no reaction products of any kind are telcased to the environment from the explosion chamber.

The procedure according to this invention can be carried out by connecting the explosion chamber to a vacuum chamber, which is kept at a predetermined negative pressure, to which the gaseous explosion products are evacuated. This approach is especially suited for relatively small explosion chambers, which are only charged with correspondingly small quantities of explosives.

The procedure according to this invention furthermore provides for establishing the negative pressure in the lock chamber by connecting this chamber to either the explosion chamber or the vacuum chamber. Due to the very small volume of the lock chamber, compared to the explosion chamber or the vacuum chamber, the lock chamber can be evacuated in a relatively short time.

A further procedural step, characteristic of the instant invention, provides for introducing the explosives, prior to conveyance into the lock chamber, into a gas- and pressure-tight preparation chamber which is connected to the lock chamber; this prevents release to the environment of explosive mixture components which may be present prior to combustion. This approach, for instance, would allow introduction of the individual components of an explosive mixture in closed containers into the preparation chamber, and preparation of the final explosive mixture in this chamber. Poisonous materials, which are to be disposed, can be added to the explosive mixture at this stage.

The procedure according to this invention furthermore provides for the presence of a lock chamber, with or without a preparation chamber, for the purpose of introducing the explosive mixture into the explosion chamber, and that said lock chamber is used for the removal of solid reaction products and/or carrier materials from the explosion chamber. By operating two lock chambers with two preparation chambers, removal of reaction products and/or carrier materials from the explosion chamber by means of one lock chamber, can be combined with the charging of an additional explosive mixture from the second lock chamber. This allows for virtually continuous use of the explosion chamber and optimum efficiency.

The procedure according to this invention provides further for choosing the amount of explosive mixture for each individual explosion chamber in such a manner that, after explosive combustion of the explosive mixture, the internal chamber pressure does not exceed 0.5 bar.

Finally, the procedure according to this invention provides for setting the predetermined negative pressure at 0.1–0.2 bar, and choosing the amount of explosive mixture in such a manner that, after explosive combustion of the explosive mixture, an internal chamber pressure of 0.2–0.3 bar is maintained. Since, under these conditions, the reaction products occur in very concentrated form, corresponding to the pressure difference of about 0.1 bar, i.e. they contain only a minor amount of air, the time required for their evacuation and re-acquisition of the predetermined negative pressure is minimized.

Furthermore, the invention provides for an explosive device of the type described earlier, in which the entry and removal features of each explosion chamber are provided with at least one lock chamber equipped with at least one inner door and one outer door. Lock chambers of this type allow introduction of explosive mixtures into the explosion chamber without significant pressure changes and releases to the environment.

The explosive device according to this invention can furthermore be designed in such a manner that the inner door of the lock chamber on its outside, and the outer door of the chamber on its inside are respectively cooperating with a similar sealing lip of the explosion chamber. This provides for the functional performance of the lock chamber as required by the procedure. With this design of the lock chamber, the inner door automatically and safely seals in response to the increased pressure gradient during a detonation in the explosion chamber.

The explosive device according to this invention can furthermore be designed in such a manner that the inner door of the lock chamber is provided with a restraining device which forces the inner door against the sealing lip against the action of a counter-acting pressure gradient.

When the vacuum condition of the lock chamber is relieved by admission of air, while the explosion chamber remains evacuated, the inner door of the lock chamber would be pulled into the explosion chamber. To counteract this, the door is forced pressure-tight against the inside of the chamber with the aid of a conventional mechanical device.

The explosive device according to this invention can furthermore be designed in such a manner that the lock chamber can be in contact with the vacuum system of the explosion chamber. Integrating the lock chamber and the explosion chamber into the same vacuum system is at once especially cost-efficient, and also provides for a simple and safe equalization of pressure between the lock chamber and the explosion chamber, for example before opening the inner door of the lock chamber.

The explosive device according to this invention can furthermore be designed in such a manner that the lock chamber is in vacuum-tight contact with at least one of the preparation chambers. This preparation chamber in turn is equipped with a door and connected to the vacuum system of the explosion chamber. The advantages of an additional preparation chamber have already been described above with reference to the procedure for operating such a device.

The explosive device according to this invention can furthermore be designed in such a manner that the explosion chamber, or explosion chambers, are connected to a common vacuum chamber which has a volume greater than twice the volume of any one explosion chamber, and which is evacuated by a vacuum pump.

In the following detailed description of the invention, three design examples of the explosion device according to this invention are described by drawings, and the specific procedural details for operating the respective design are elaborated.

DETAILED DESCRIPTION OF THE INVENTION

Figure 1:
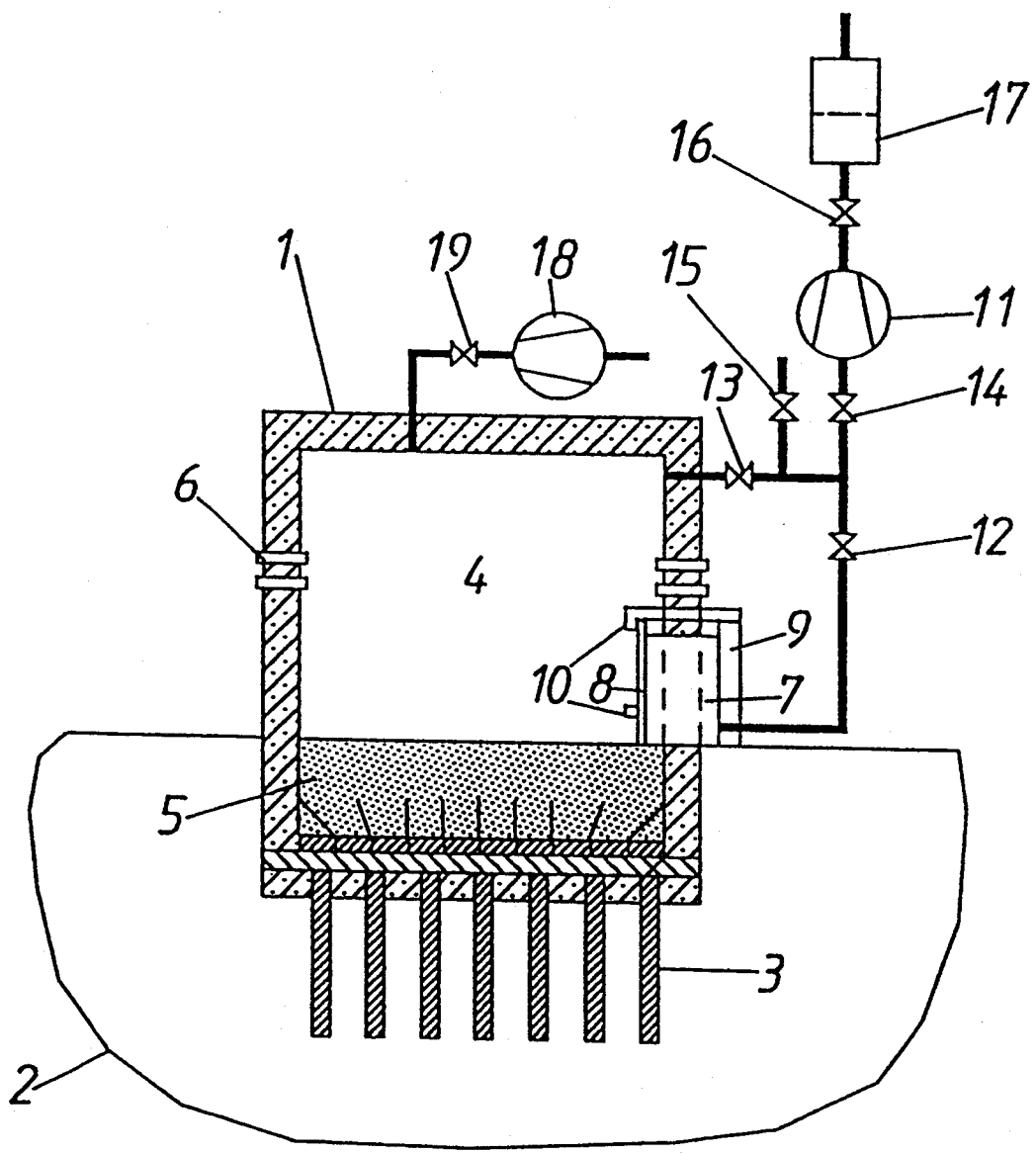
FIG. 1 is a cross-sectional view of an explosion device according to the invention, featuring one explosion chamber, one lock chamber and a single vacuum system.

FIG. 1 shows a simple design of an explosion device according to the invention. An explosion chamber (1) is anchored in a foundation (2) through anchor rods (3). Foundation (2) provides a blasting base (5) on which the explosive mixture can be deposited prior to ignition. In addition, compensating devices (6) are schematically indicated, they serve to partially compensate for the explosive shockwaves produced by the detonation. The lock chamber (7), with an inner (8) and outer door (9) is located in the chamber wall. Additionally, the drawing schematically details a restraining mechanism (10) for the inner door (8) of the lock chamber. Explosive chamber (1) and lock chamber (7) are both connected to a vacuum system, which consists of vacuum pump (11)

and the miscellaneous valves (12) to (16). At the exit side of vacuum pump (11), a filtration device (17) is schematically indicated, it allows for the environmentally safe disposal of any toxic materials which might be produced by the explosive combustion. A ventilation fan (18) is located at the opposite side of explosion chamber (1), in conjunction with valve (19), it can be used to flush the interior volume (4) of explosion chamber (1) for cleaning purposes as needed.

During operation of the explosion device shown here, for example to dispose of explosives, explosion chamber (1) should be evacuated to a predetermined negative pressure of approximately 0.1 bar. By opening valves (12) and (15), lock chamber (7) is brought to atmospheric pressure. Restraining mechanism (10) of the inner lock chamber door (8) provides a secure seal for explosion chamber (1) against the external pressure. After opening the outer lock chamber door (9) the explosives are deposited in lock chamber (7), and outer door (9) is closed again. Lock chamber (7), after closing valve (15), is then returned to an evacuated state by opening valves (12) and (13) and using the negative pressure condition of explosion chamber (1). Due to the relatively smaller chamber volume of lock chamber (7), compared with the volume of explosion chamber (1), the pumping action to return to the pre-set negative pressure will be completed relatively quickly. After both pressures are equalized, inner lock chamber door (8) is opened and the explosives are transferred to explosion chamber (1). After closing inner lock chamber door (8) the explosive combustion process can be initiated. Due to the pressure gradient arising in the direction of lock chamber (7), the sealing efficiency of the inner lock chamber door (8) is reinforced. The gaseous reaction products produced by the explosive transformation can now be evacuated from explosion chamber (1) with the aid of vacuum pump (11), and, if indicated, be passed on to a state of the art filtration system (17). The initial amount of explosives was chosen in such a manner that, on detonation, the interior pressure in explosion chamber (1) rose only to about 10% of the atmospheric pressure outside, thus, only this relatively small pressure differential has to be removed by pumping action to return to the pro-set vacuum.

Figure 2:
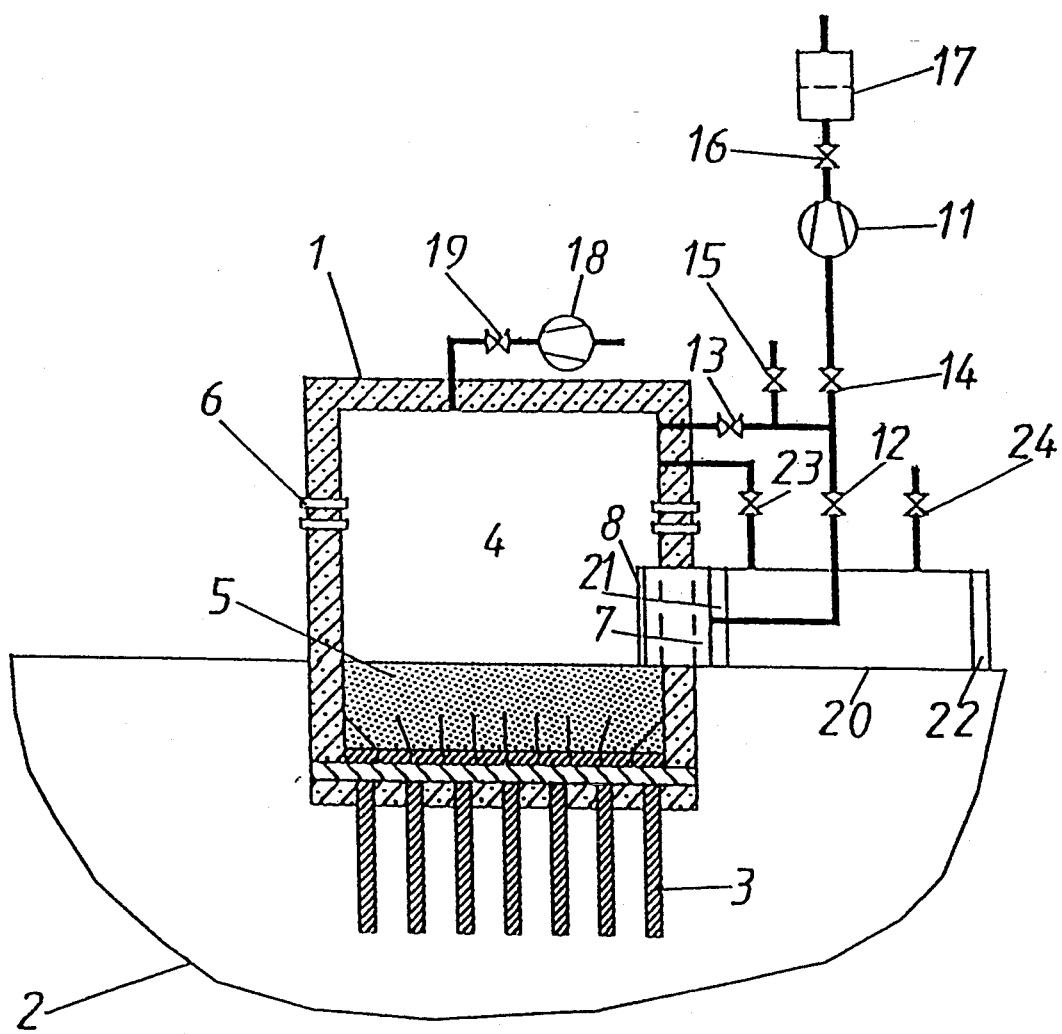
FIG. 2 is a cross-sectional view of an explosion device similar to the one illustrated in FIG. 1, featuring an additional preparation chamber and an expanded vacuum system.

FIG. 2 shows the same explosion device as described in FIG. 1, but with the additional feature of a preparation chamber (20), located in front of lock chamber (7). The volume of preparation chamber (20) is considerably larger than that of lock chamber (7), and the connection between preparation chamber (20) and lock chamber (7) is gas- and pressure-tight. An intermediate door (21) is located between preparation chamber (20) and lock chamber (7), while at the entrance to preparation chamber (20) an outer door (22) is installed. Preparation chamber (20) is directly connected to explosion chamber (1) through vacuum equalization line (23), and can thus be evacuated. The chamber (20) can further be independently brought to atmospheric pressure condition by means of pressure equalization line (24).

The explosion device shown in FIG. 2 can be operated in similar fashion as the explosion device shown in FIG. 1. However, significantly larger dimensioned explosive mixtures can be transferred to explosion chamber (1). In addition, the starting components of the explosive mixture can initially be placed into preparation chamber (20) in secure containers, and, after sealing space (20) against the environment, mixing of the final explosive mixture can be carried out. Subsequently, preparation chamber (20) can be evacuated by means of vacuum equalization line (23) and the explosive mixture be conveyed into explosion chamber (1), via lock chamber (7), by the previously described procedure. Operation then continues as described for the explosion device according to FIG. 1.

Figure 3:
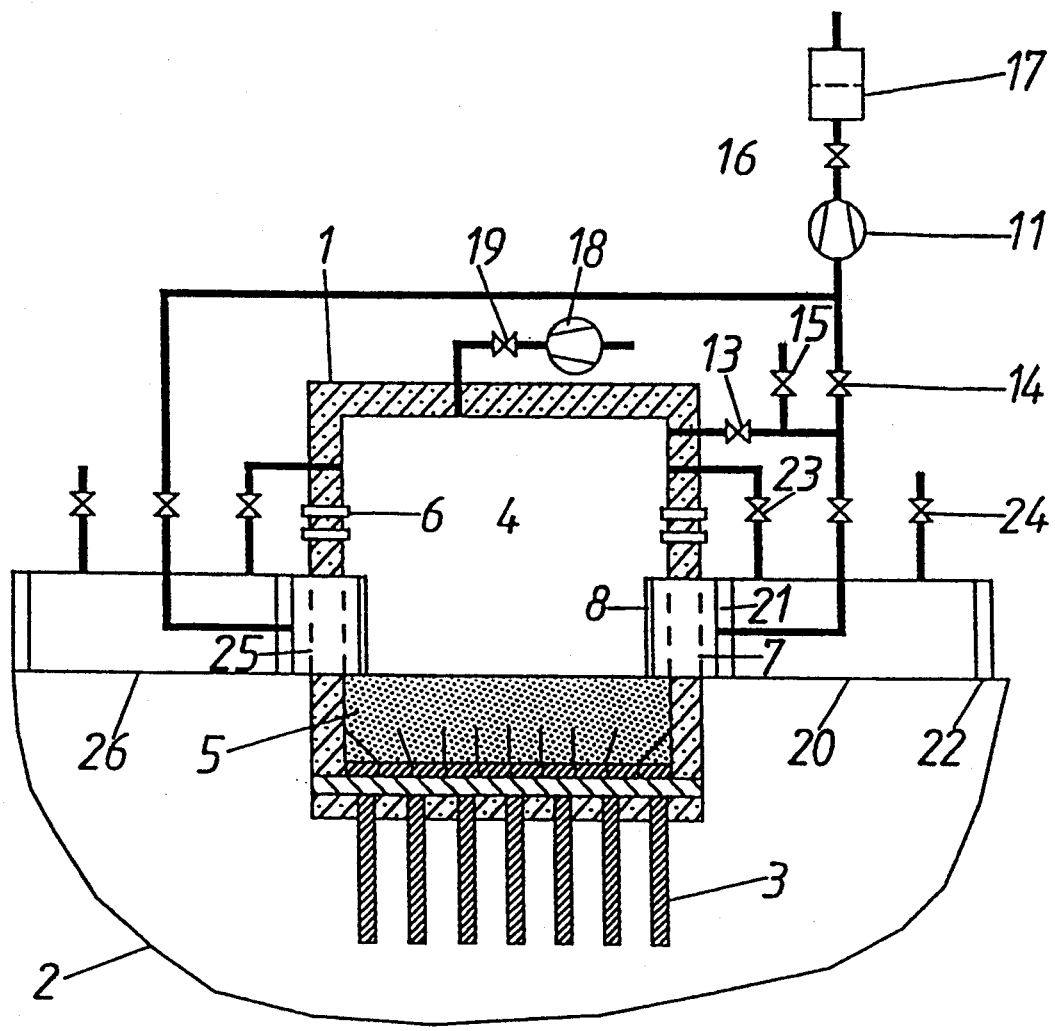
FIG. 3 is a cross-sectional view of an explosion device similar to the one illustrated in FIG. 2, featuring, in addition, two lock chambers and two preparation chambers.

Finally, FIG. 3 describes an explosion device according to FIG. 2, however, with respectively two lock chambers (7) and (25), and two preparation chambers (20) and (26). The design of the two lock chamber systems (7,20) and (25,26), as well as their connections to the vacuum system of the explosive chamber (1) is identical.

Operation of the explosion device shown in FIG. 3 is similar to the procedure detailed for the device shown in FIG. 2. The difference in operational mode consists in the fact that, while an explosive mixture is transferred to explosion chamber (1) via the first chamber system (7 and 20) in the manner described for FIG. 2, the second chamber system (25 and 26) can be in operation to remove any possible solid reaction products or carrier means (e.g. pallets) from explosion chamber (1). Furthermore, it is now possible to charge explosion chamber (1) via chamber system (7 and 20) with additional explosive mixture while removal and disposal of reaction products is still in progress in the second chamber system (25 and 26). This allows for optimal capacity use of explosion chamber (1).

Figure 4:
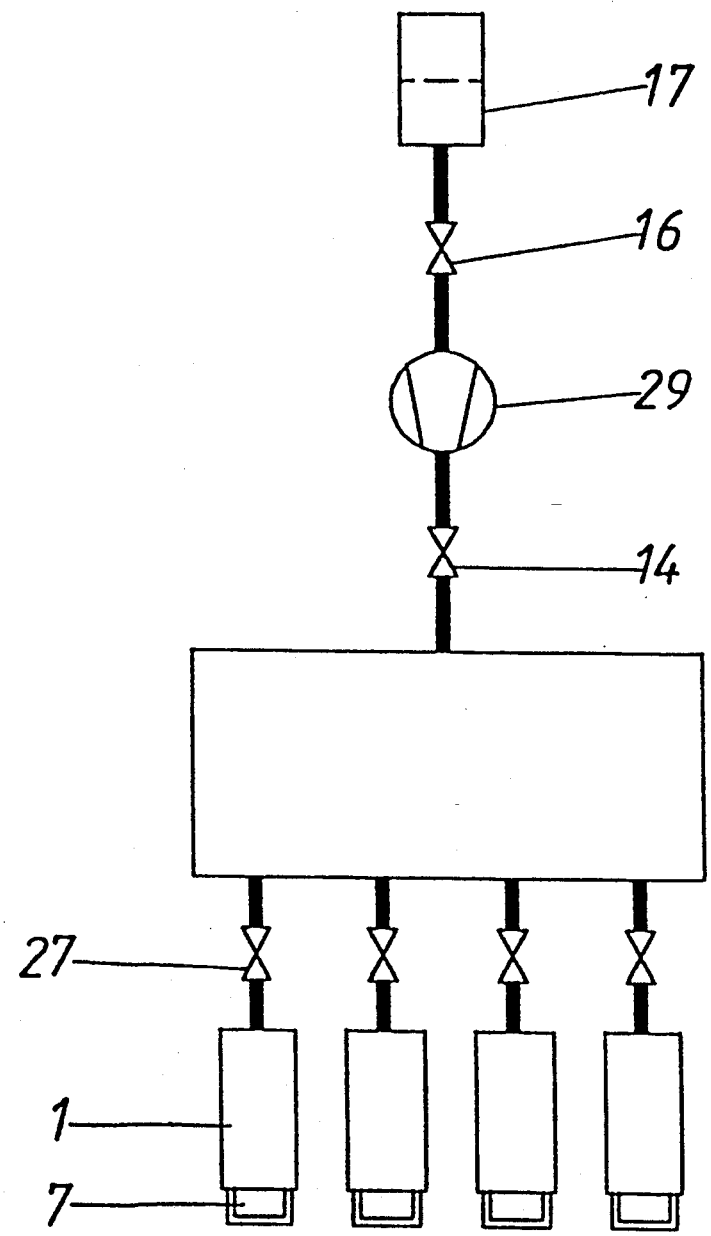
FIG. 4 is a schematic drawing which shows how several explosion chambers can be connected with one vacuum chamber.

The schematic design shown in FIG. 4 shows how explosion chambers (1) are respectively connected to a vacuum chamber (28) by means of valves (27). A vacuum pump (29) produces the pro-set negative pressure in chamber (28). When, after an explosion process, valve (27) of the respective explosion chamber (1) is opened, the existing gases present in chamber (1) are sucked into vacuum chamber (28) due to the existing pressure differential and are removed from chamber (28) by vacuum pump (29) to a filtration device, or arc passed on to another processing means.

I claim:

1. A method for operating an explosion device comprising an explosion chamber and a lock chamber, in connection with the explosive disposal of a material and the explosive forming of a workpiece, said method comprising the steps of
    placing an explosive mixture into the lock chamber,
    evacuating the lock chamber with a vacuum to produce a subatmospheric pressure condition in the lock chamber,
    transferring the explosive mixture from the lock chamber to the explosion chamber,
    evacuating the explosion chamber with a vacuum to produce a subatmospheric pressure condition in the explosion chamber,
    initiating explosive combustion of the explosive mixture in the explosion chamber,
    evacuating the gaseous reaction products of the explosive combustion from the explosion chamber and
    removing solid reaction products from the explosive combustion from the explosion chamber through the lock chamber.

2. An explosion device for use in connection with the explosive disposal of a material and the explosive forming of a workpiece, said device comprising
    at least one explosion chamber which is anchored in a foundation, a lock chamber including an inner door for transferring an explosive mixture from said lock chamber into said explosion chamber and an outer door for removing material from said lock chamber, said inner door being operable, in a closed position, to prevent communication between said explosion chamber and said lock chamber, means in said explosion chamber for absorbing the explosive energy generated by the explosion of an explosive mixture in said explosion chamber, a vacuum system, and means connecting said vacuum system to said lock chamber and to said explosion chamber for establishing a vacuum condition within said lock chamber and within said explosion chamber.

3. The method claimed in claim 1 wherein the gaseous explosion products are evacuated to a vacuum chamber, which is kept at a pre-set vacuum, by connecting the explosion chamber to said vacuum chamber.

4. The method claimed in claim 1 wherein the negative pressure in the lock chamber is produced by providing a connection between this chamber and the evacuated explosion chamber or the vacuum chamber.

5. The method claimed in claim 3 wherein the negative pressure, in the lock chamber is produced by providing a connection between this chamber and the evacuated explosion chamber or the vacuum chamber.

6. The method claimed in claim 1 wherein the explosive mixture is introduced into the explosion chamber and solid reaction products including any carrier means are removed therefrom, through the lock chamber.

7. The method claimed in claim 3 wherein the explosive mixture is introduced into the explosion chamber and solid reaction products including any carrier means are removed therefrom, through the lock chamber.

8. The method claimed in claim 4 wherein the explosive mixture is introduced into the explosion chamber and solid reaction products including any carrier means are removed therefrom, through the lock chamber.

9. The method claimed in claim 5 wherein the explosive mixture is introduced into the explosion chamber and solid reaction products including any carrier means are removed therefrom, through the lock chamber.

10. The method claimed in claim 1 wherein the amount of explosive for each individual explosion chamber is controlled so that the internal pressure in the chamber, after the explosive combustion event, does not exceed 0.5 bar.

11. The method claimed in claim 7 wherein the subatmospheric pressure in the explosion chamber is between 0.1–0.2 bar and wherein the amount of explosive mixture is controlled so that, after the explosive combustion event, the pressure in the explosion chamber is between 0.2–0.3 bar.

12. A method for operating an explosion device comprising an explosion chamber, a hermetically sealed preparation chamber and a lock chamber, in connection with the explosive disposal of a material and the explosive forming of a workpiece, said method comprising the steps of placing an explosive mixture into the preparation chamber where the explosive mixture is isolated from the environment, transferring the explosive mixture to the lock chamber, evacuating the lock chamber with a vacuum to produce a subatmospheric pressure condition in the lock chamber, transferring the explosive mixture from the lock chamber to the explosion chamber, evacuating the explosion chamber with a vacuum to produce a subatmospheric pressure condition in the explosion chamber, initiating explosive combustion of the explosive mixture in the explosion chamber, evacuating the gaseous reaction products of the explosive combustion from the explosion chamber and removing solid reaction products from the explosive combustion from the explosion chamber through the lock chamber.

13. The method claimed in claim 12 wherein the amount of explosive for each individual explosion chamber is controlled so that the internal pressure in the chamber, after the explosive combustion event, does not exceed 0.5 bar.

14. The method claimed in claim 13 wherein the subatmospheric pressure in the explosion chamber is between 0.1–0.2 bar and wherein the amount of explosive mixture is controlled so that, after the explosive combustion event, the pressure in the explosion chamber is between 0.2–0.3 bar.

15. The explosion device claimed in claim 2 which further comprises a sealing lip at the explosion chamber and wherein the inner door of lock chamber, on its outside, and outer door on its inside, cooperate with said sealing lip.

16. The explosion device claimed in claim 2 which further comprises a restraining device associated with the inner door of said lock chamber, and wherein an explosive event in the explosion chamber causes a pressure gradient which forces said inner door to engage said sealing lip.

17. The explosion device claimed in claim 15 which further comprises a restraining device associated with the inner door of said lock chamber, and wherein an explosive event in the explosion chamber causes a pressure gradient which forces said inner door to engage said sealing lip.

18. The explosion device claimed in claim 2 wherein said vacuum system comprises a vacuum chamber and a vacuum pump connected to said vacuum chamber, wherein said vacuum chamber is connected to all of said at least one explosion chamber, and wherein said vacuum chamber has a volume at least twice as large as each of said at least one explosion chamber.

19. The explosion device claimed in claim 2 which further comprises a preparation chamber having at least one door and means connecting said at least one preparation chamber to said vacuum system, said preparation chamber being connected to at least one lock chamber by vacuum-tight connections.

20. The explosion device claimed in claim 19 wherein said vacuum system comprises a vacuum chamber and a vacuum pump connected to said vacuum chamber, wherein said vacuum chamber is connected to all of said at least one explosion chamber, and wherein said vacuum chamber has a volume at least twice as large as each of said at least one explosion chamber.

* * * * *